(12) United States Patent
Stojkovic et al.

(10) Patent No.: US 10,081,292 B2
(45) Date of Patent: Sep. 25, 2018

(54) VEHICLE TAILGATE TIE-DOWN

(71) Applicant: Ford Global Technologies, LLC, Dearborn, MI (US)

(72) Inventors: Dragan B. Stojkovic, Taylor, MI (US); Stephen Thomas Kozak, Northville, MI (US); Jack Marchlewski, Saline, MI (US); Joshua R. Hemphill, White Lake, MI (US); Colleen Marie Hoffman, Canton, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 15/363,229

(22) Filed: Nov. 29, 2016

(65) Prior Publication Data

US 2018/0147976 A1 May 31, 2018

(51) Int. Cl.
*B60P 7/08* (2006.01)
*B62D 33/03* (2006.01)
*B62D 33/027* (2006.01)

(52) U.S. Cl.
CPC ........ *B60P 7/0823* (2013.01); *B62D 33/0273* (2013.01); *B62D 33/03* (2013.01); *B60P 7/0807* (2013.01)

(58) Field of Classification Search
CPC ..... B60P 7/0807; B60P 7/0815; B60P 7/0823; B60P 1/286; B60P 3/07; B60P 3/122; B60P 7/15; B60P 1/00
USPC .......... 410/106, 104, 116, 112, 97, 102, 110, 410/111, 101, 107; 296/186.1, 191, 296/182.1, 100.02, 100.1, 183.1, 184.1, 296/204, 26.09
See application file for complete search history.

(56) References Cited

U.S. PATENT DOCUMENTS

| | | | | |
|---|---|---|---|---|
| 5,011,349 A * | 4/1991 | McAndrews | .......... | A44B 11/25 24/197 |
| 5,490,663 A * | 2/1996 | Stojkovic | ................ | B25B 5/061 269/233 |
| 6,302,465 B1 * | 10/2001 | Faber | ...................... | B60P 1/003 296/39.1 |
| 6,783,313 B1 * | 8/2004 | Huang | .................. | B60P 7/0807 410/102 |
| 6,820,910 B1 * | 11/2004 | Tan | .................... | B62D 33/0273 296/106 |
| 7,021,689 B1 * | 4/2006 | Weisbeck, III | .... | B62D 33/0273 296/26.11 |
| 7,780,211 B2 * | 8/2010 | Leggett | ................ | B62D 33/033 294/26 |
| 7,909,553 B2 * | 3/2011 | Snyder | ...................... | B60R 9/00 410/100 |
| 8,410,921 B1 * | 4/2013 | Lewis | .................... | B60K 35/00 340/457 |
| 2004/0042869 A1 * | 3/2004 | Tucker, II | ........... | E05B 15/0245 411/172 |

(Continued)

*Primary Examiner* — D Glenn Dayoan
*Assistant Examiner* — Sunsurraye Westbrook
(74) *Attorney, Agent, or Firm* — Jason Rogers; Price Heneveld LLP

(57) ABSTRACT

A vehicle is provided herein. The vehicle includes a tailgate adapted to pivotally latch to a vehicle cargo box. A tie-down member having a base portion is coupled to a lateral side of the tailgate assembly. The tie-down member further includes a retaining portion extending from the base portion. The retaining portion may include first and second substantially parallel channels.

20 Claims, 11 Drawing Sheets

(56) References Cited

U.S. PATENT DOCUMENTS

| | | | |
|---|---|---|---|
| 2013/0251474 A1* | 9/2013 | Neumann | B60R 7/02 410/106 |
| 2015/0367896 A1* | 12/2015 | Marchlewski | E05B 79/02 296/183.1 |
| 2017/0021757 A1* | 1/2017 | Nutter | B60P 7/0823 |

* cited by examiner

VEHICLE TAILGATE TIE-DOWN

FIELD OF THE INVENTION

The present invention generally relates to vehicle tailgate assemblies, and more particularly relates to a tailgate assembly having a tie-down member thereon.

BACKGROUND OF THE INVENTION

Automotive vehicles, such as pickup trucks, are commonly employed with a cargo box or bed that may be used to transport various items. The vehicle cargo box typically has a tailgate assembly which generally extends between the rear lateral walls and pivots about a hinge assembly near a lower edge of the tailgate assembly between a closed position and an open position. In the open position, cargo may be easily loaded into and unloaded from the cargo box and the tailgate assembly may be pivoted to the closed position to retain the cargo within the cargo box. It is desirable to provide for alternative ways of allowing users to utilize the cargo box.

SUMMARY OF THE INVENTION

According to one aspect of the present invention, a vehicle is disclosed. The vehicle includes a tailgate adapted to pivotally latch to a vehicle cargo box. A tie-down member is coupled to the tailgate and has a base portion disposed on a lateral side of the tailgate assembly and a retaining portion extending from the base portion. The retaining portion includes first and second substantially parallel channels.

According to another aspect of the present invention, a vehicle is disclosed. The vehicle includes a tailgate assembly adapted to pivotally latch to a cargo box. The tailgate assembly is laterally separated from the cargo box by a gap. A tie-down member is coupled to the tailgate assembly and has a base portion and a retaining portion extending from the base portion. The tie-down member has a thickness that is less than a thickness of the gap.

According to yet another aspect of the present invention, a vehicle is disclosed. The vehicle includes a tailgate assembly adapted to pivotally latch to a cargo box. A tie-down member is coupled to the tailgate assembly and has a base portion and a retaining portion extending from the base portion. The retaining portion has a first section that extends laterally away from the tailgate assembly and a second section that extends towards a rear portion of the tailgate assembly.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
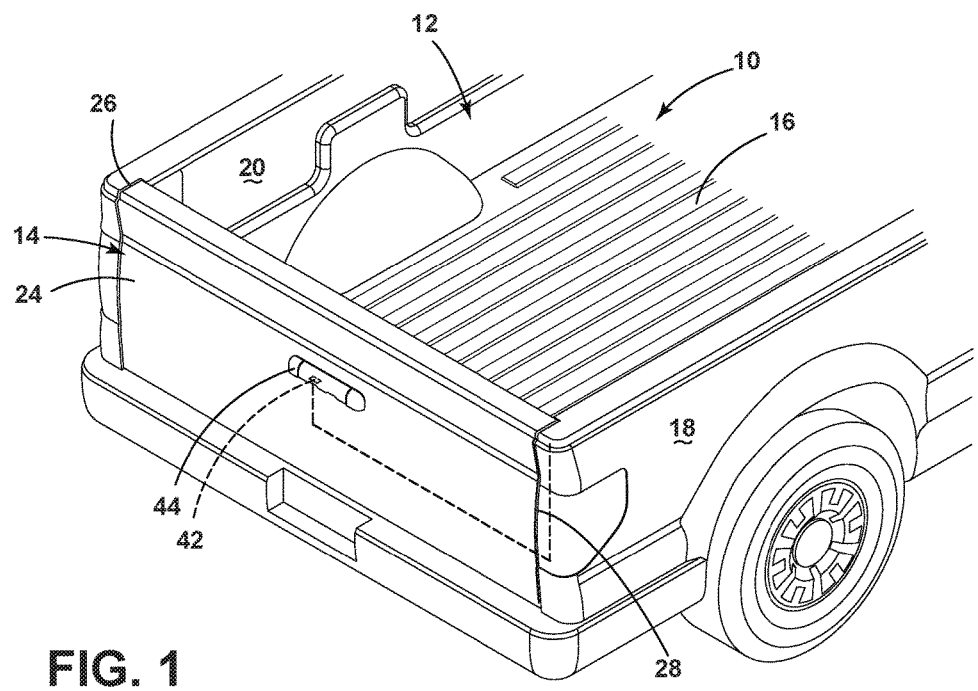
FIG. 1 is a rear side perspective view of a pickup truck cargo box having a tailgate assembly, according to one embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a tie-down member disposed on a tailgate assembly of a vehicle. The tie-down member may advantageously provide additional attachment points to retain cargo within a box, or compartment, of the vehicle. In some embodiments, the tie-down member may be concealed when the tailgate assembly is placed in a closed position and accessible when the tailgate assembly is placed in an open position.

Figure 2:
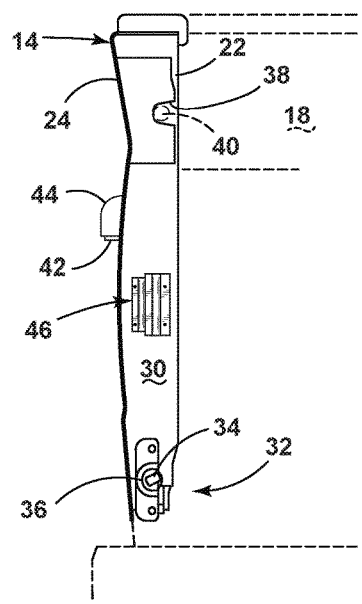
FIG. 2 is a side plan view of the tailgate assembly shown in FIG. 1 with the tailgate assembly in the closed position.

Referring to FIGS. 1 and 2, an automotive vehicle 10 in the form of a pickup truck is shown having a cargo box or bed 12 and equipped with a tailgate assembly 14 defining a rear wall of the cargo box 12, according to one embodiment. The cargo box 12 generally has a bottom floor 16, and lateral sidewalls 18 and 20, and a front wall (not shown). The rear wall of the cargo box 12 is defined by the tailgate assembly 14. The tailgate assembly 14 moves between an upright, vertical closed position to serve as the rear wall of the cargo box 12 and a downward, horizontal open position generally shown in FIG. 3.

The tailgate assembly 14 includes an interior side 22 that forms the rear wall of the cargo box 12, in some embodiments. An outer side 24 of the tailgate assembly 14 faces vehicle 10 rearward in when the tailgate assembly 14 is in the closed position. First and second lateral sides 26, 28 couple the interior and outer sides 22, 24 to one another. The interior side 22, the outer side 24, and the first and second lateral sides 26, 28 define a cavity 30 therebetween.

The tailgate assembly 14 extends between the sidewalls 18, 20 of the cargo box 12 and has a pair of hinge pivots 32 on opposite lateral sides 26, 28 of the tailgate assembly 14 near a bottom edge. The hinge pivots 32 may each include a hinge socket 34 and a pivot bracket 36 that allows the tailgate assembly 14 to pivot about the bottom edge relative to a supporting vehicle structure, such as the D-pillars. The hinge pivots 32 may be keyed to allow removal of the tailgate assembly 14 from the vehicle 10. The hinge pivots 32 may include a lift assist mechanism such as a torsion bar.

The tailgate assembly 14 further includes a latch mechanism 38 located on opposite sides 26, 28 near the top edge configured to engage and latch onto rods 40 on the cargo box 12, such as the D-pillar, to retain the tailgate assembly 14 latched in the closed position. The latch mechanism 38 of the tailgate assembly 14 may employ conventional latching assemblies. The latch mechanism 38 may be controlled to open in response to actuation of a switch 42, which is shown built into a tailgate assembly release latch handle 44. In one embodiment, the switch 42 may be actuated by a user to unlatch the latch mechanism 38 to open the tailgate assembly 14. In one embodiment, the latch mechanism 38 may be electronically actuated to the unlatched position in response to actuation of the switch 42. However, it should be appreciated that the switch 42 and the latch mechanism 38 may be otherwise configured such as mechanical user actuated devices.

Figure 3:
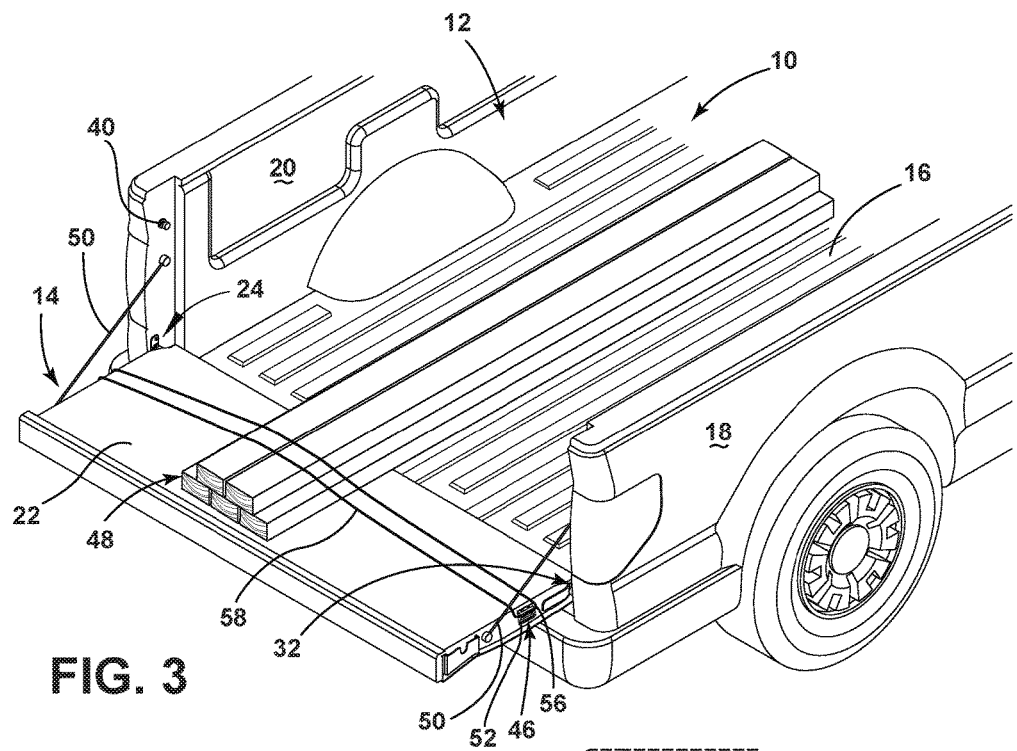
FIG. 3 is a rear side perspective view of the pickup truck cargo box with the tailgate assembly having the tailgate assembly in a horizontal, open position thereby providing access to a tie-down member disposed on a lateral side of the tailgate assembly, according to one embodiment.
Figure 4:
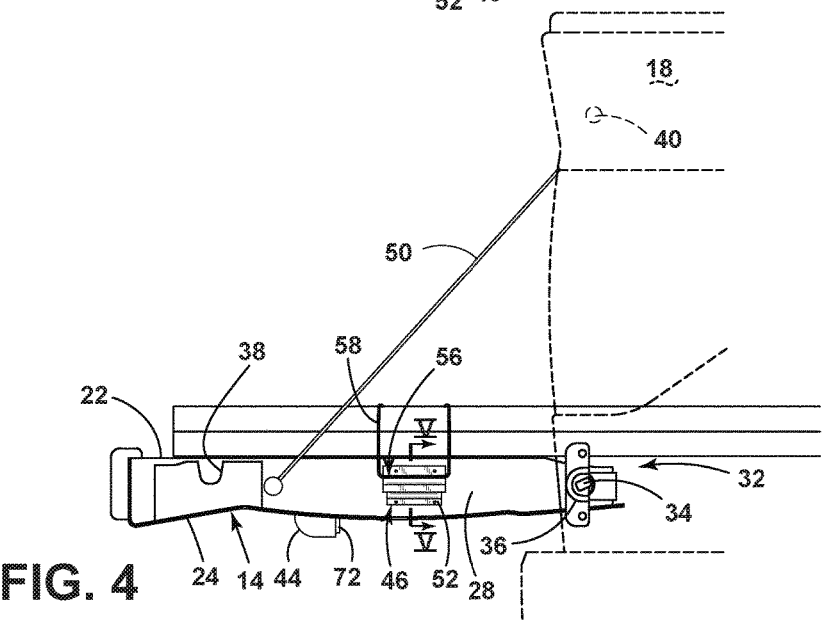
FIG. 4 is a side plan view of the tailgate assembly shown in FIG. 3 with the tailgate assembly in the open position and a cord disposed within the tie-down member, according to one embodiment.

Referring to FIGS. 1-4, a tie-down member 46 is disposed on a lateral side 26, 28 of the tailgate assembly 14. The tie-down member 46 may be configured as a cleat or any other type of device that is configured to assist in retaining cargo 48 (FIG. 3) within the cargo box 12. The tie-down member 46 may be concealed between the tailgate assembly 14 and one or more of the sidewalls 18, 20 of the cargo box 12 when the tailgate assembly 14 is in the closed position and, as illustrated in FIGS. 3 and 4, may be accessible when the tailgate assembly 14 is in the open position.

Figure 5:
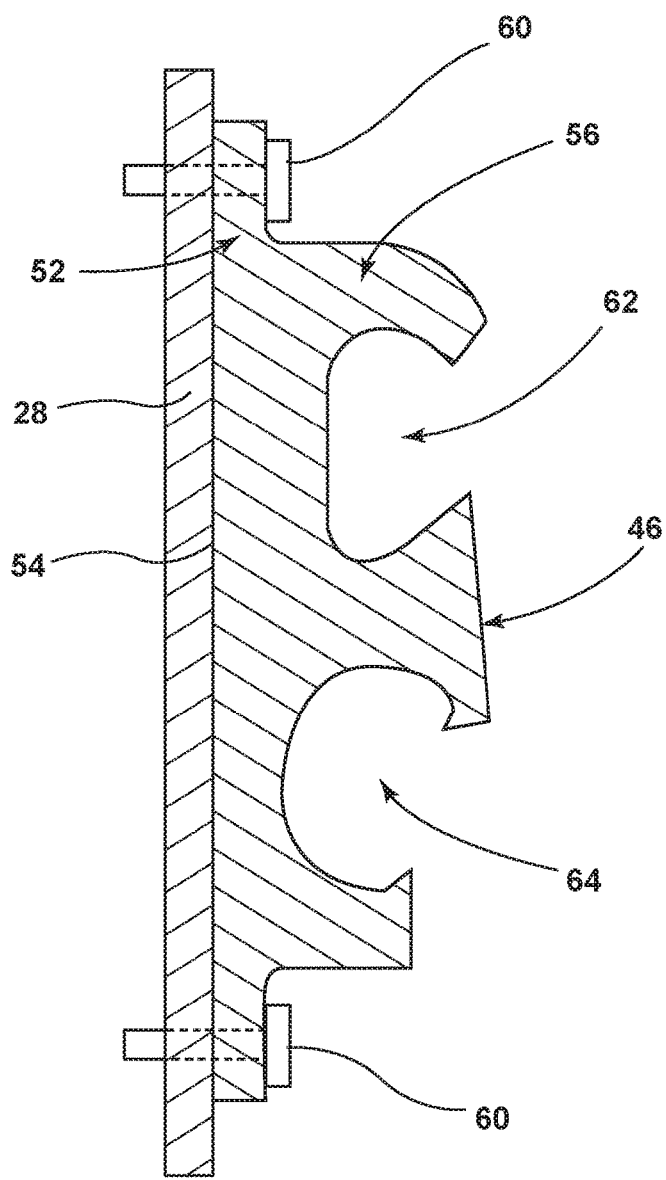
FIG. 5 is a cross-sectional view of the tie-down member taken along the line V-V of FIG. 4 illustrating the tie-down member, according to one embodiment.

Referring to FIGS. 3-5 the tailgate assembly 14 may include a pair of support cables 50 connected at each end to the vehicle body structure such as the D-Pillars to support the tailgate assembly 14 and any load applied thereto when in the horizontal open position. While the tailgate assembly 14 is in the open position, the cargo 48 stored within the cargo box 12 may extend outwardly of a rear end of the cargo box 12 and/or above the interior side 22 of the tailgate assembly 14.

The tie-down member 46, which is accessible when the tailgate assembly 14 is in the open position, includes a base portion 52 that is coupled to the tailgate assembly 14 and includes a bottom side 54 that is disposed against the tailgate assembly 14. The tie-down member 46 also includes a retaining portion 56 extending from the base portion 52 that may be configured to receive a cord such as a rope, a tie-down, a belt, and/or the like. The retaining portion 56 may also be configured to accept any other device therein or thereon, such as a hook, a carabineer, etc., for assisting in maintaining cargo 48 on the tailgate assembly 14. A plurality of mechanical fasteners 60 are provided for secure attachment of the tie-down member 46 to the tailgate assembly 14. The fasteners 60 may be any known type of fastener and may be removable in some embodiments such that the tie-down member 46 may be selectively coupled to and removed from the tailgate assembly 14.

As illustrated in FIGS. 2-5, the retaining portion 56 defines first and second substantially parallelly extending channels 62, 64. Each channel 62, 64 of the tie-down member 46 may have a similar cross-sectional geometry. Alternatively, as illustrated in FIG. 5, the first channel 62 may have a first cross-sectional geometry while the second channel 64 may define a second cross-sectional geometry. It will be appreciated that the tie-down member 46 shown in FIGS. 2-5 is for illustrative purposes and is not intended as being limiting, as any one of a great variety of tie-down members 46 may be used without departing from the scope of the present disclosure.

The tie-down member 46 may be composed of metallic material, a composite material, a polymeric material, and/or a combination thereof and formed from a stamping process, an extrusion process, a rolling process, a forging process, a drawing process, a molding process, and/or any other process known in the art. Subsequent operations, such as punching, blanking, piercing, bending, and/or any other operation may be subsequently performed to create any practicable geometry of the tie-down member 46. Accordingly, the tie-down member 46 may be formed with low manufacturing costs, allowing a customer to increase their cargo flexibility with a greater number of attachment points for the same total cost. It will be appreciated, however, that other materials and methods of production of the tie-down member 46 may additionally or alternatively be employed.

Figure 6:
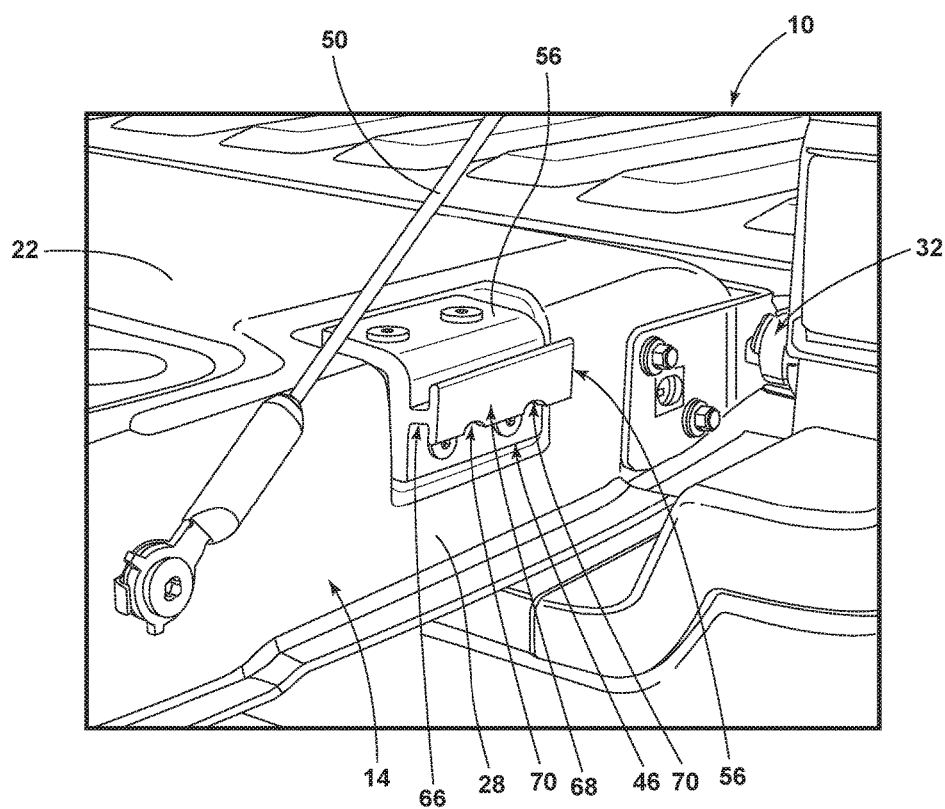
FIG. 6 is a rear side perspective view of the tailgate assembly having the tie-down member couple to two sides of the tailgate assembly, according to one embodiment.
Figure 7A:
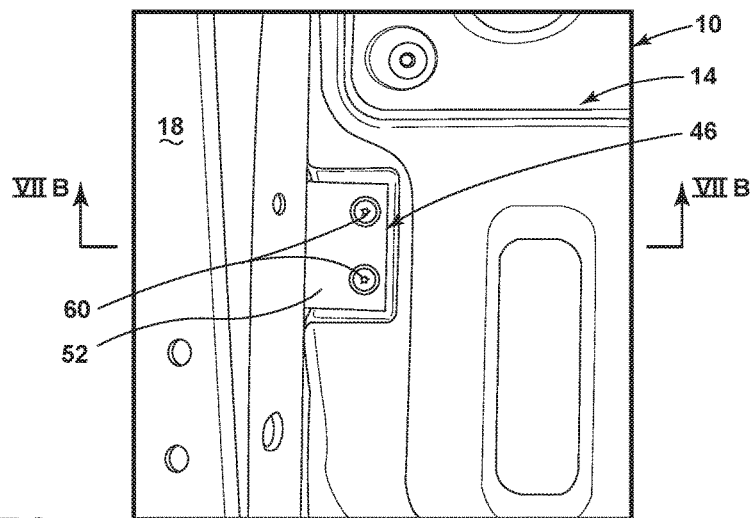
FIG. 7A is a front perspective view of the tailgate assembly with the tailgate assembly in the closed position and having the tie-down member of FIG. 6 disposed thereon.
Figure 7B:
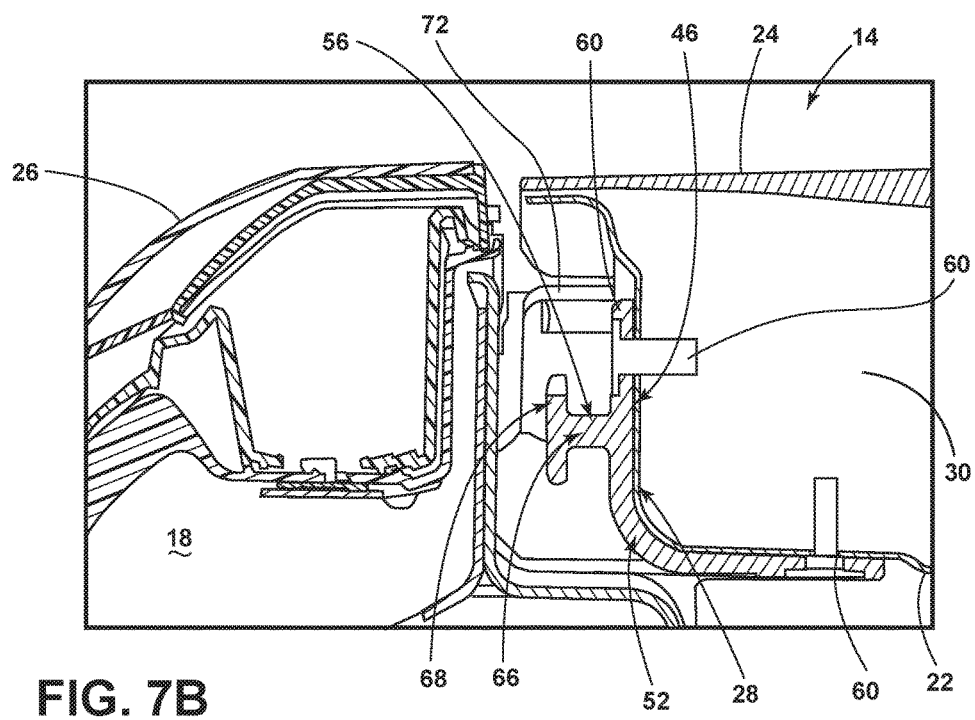
FIG. 7B is a cross-sectional view of the tie-down member taken along the line VIIB-VIIB of FIG. 7A.

Referring to FIGS. 6-7B, the retaining portion 56 includes a first, centrally disposed section 66 extending from the base portion 52. A second, transversely disposed top section 68 is disposed at an opposing end of the first section 66 from the base portion 52. An outer perimeter of the second section 68 may include features 70. For example, notches may be added for maintaining the cord 58 in the retaining portion 56 of the tie-down member 46. As will be described in greater detail herein, the features 70 may additionally, and/or alternatively, be configured to hold an item, open an item, hold the tailgate assembly 14 in any position, etc.

As provided above, the tailgate assembly 14 is adapted to pivotally latch to a pickup truck cargo box 12. The tailgate assembly 14 is laterally separated from the cargo box 12 by a gap 72. The tie-down member 46 has a thickness t that is less than a thickness x of the gap 72. Accordingly, the tie-down member 46 may be concealed when the tailgate assembly 14 is in the closed position and accessible when the tailgate assembly 14 is in a position other than the closed position.

Figure 8:
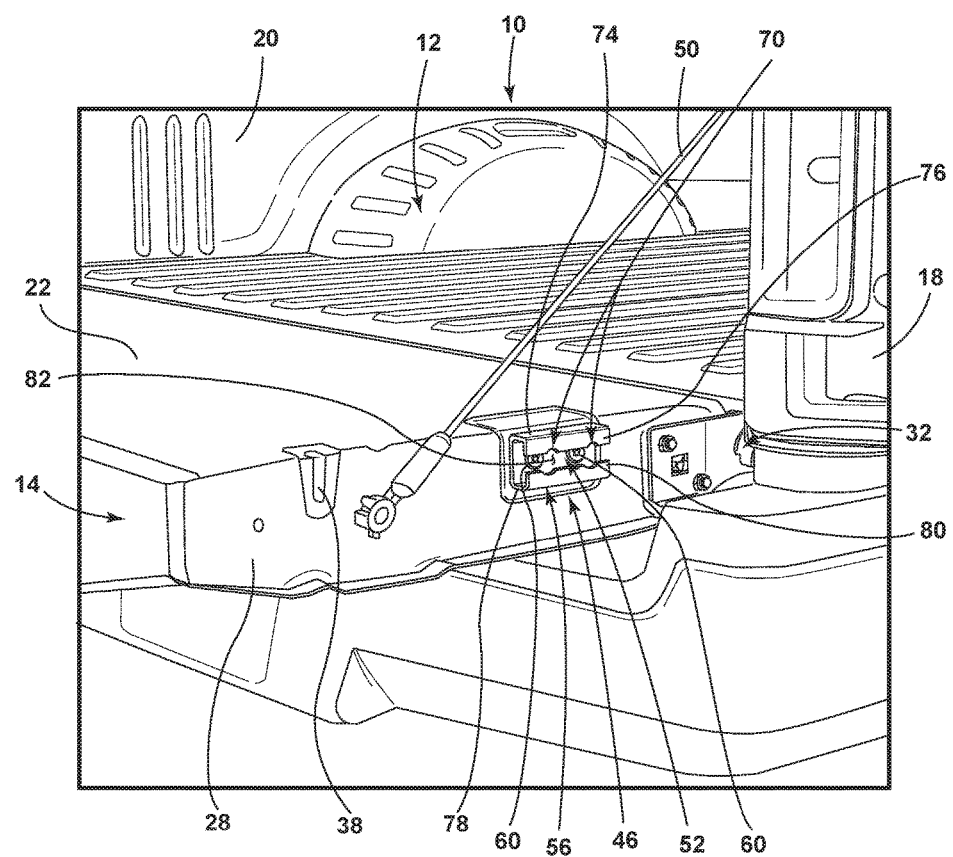
FIG. 8 is a rear side perspective view of the pickup truck cargo box having the tailgate assembly in the open position with the tie-down member disposed on a lateral side of the tailgate assembly, according to one embodiment.
Figure 9:
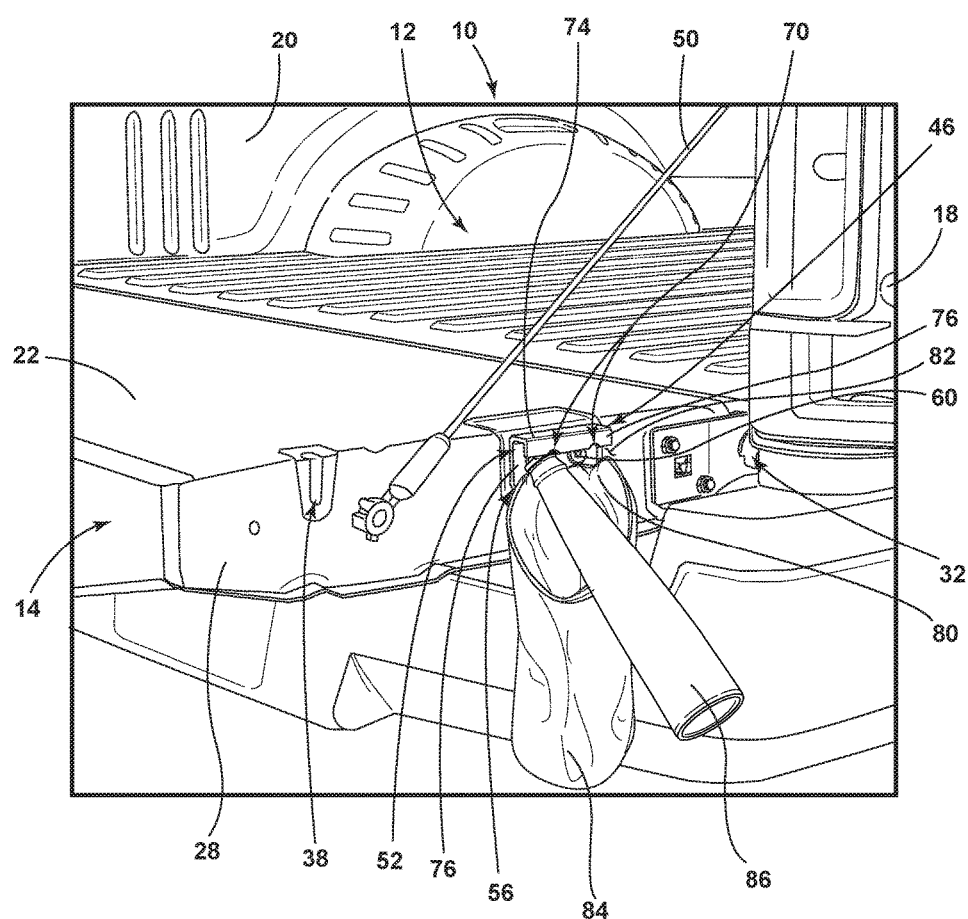
FIG. 9 is a rear side perspective view of the tailgate assembly shown in FIG. 8 with a container hanging from the tie-down member and a bottle having a cap thereon disposed in an opening defined by the retaining portion of the tie-down member.
Figure 10:
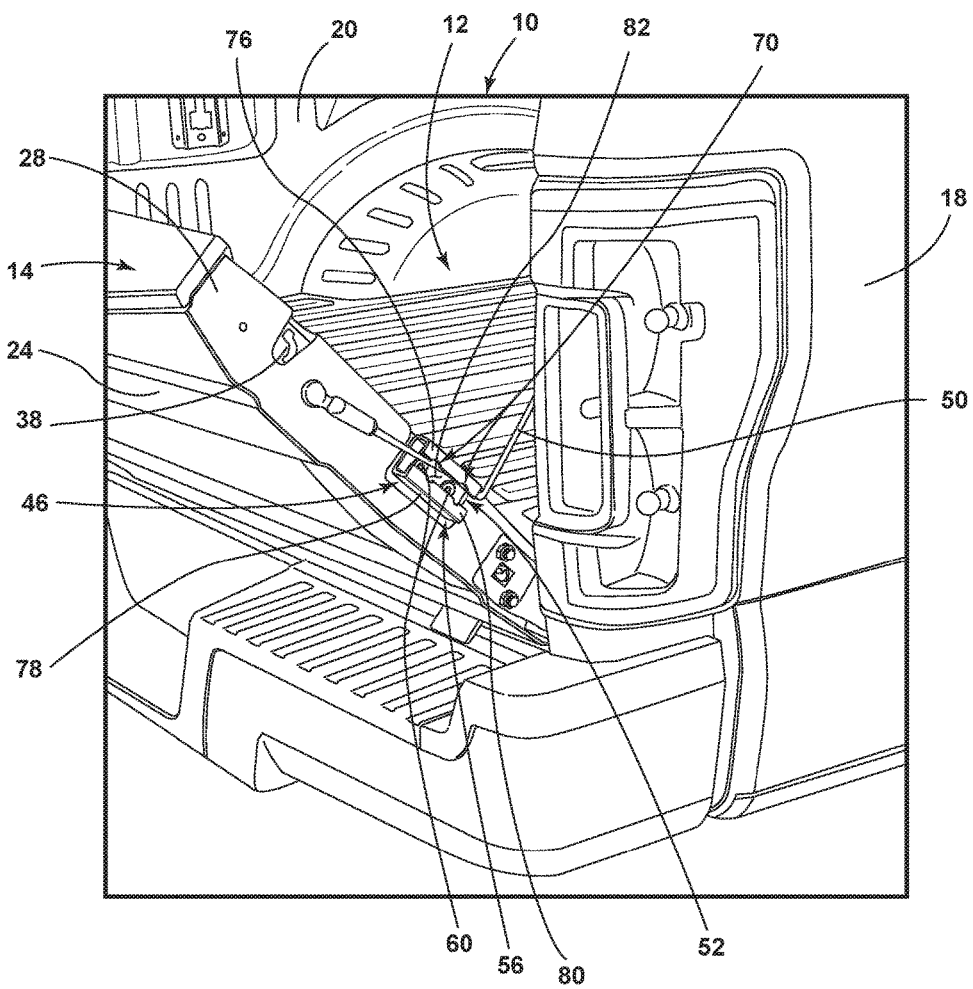
FIG. 10 is a rear side perspective view of the tailgate assembly shown in FIG. 8 with a support cable of the tailgate assembly disposed within a retaining cavity of the tie-down member.

Referring to FIGS. 8-10, the tie-down member 46 includes the base portion 52 and the retaining portion 56 extending from the base portion 52. The retaining portion 56 includes a first section 74 that extends laterally away (i.e., vehicle 10 side to side) from the lateral side 28 of the tailgate assembly 14 and a second section 76 that extends towards the outer side 24 (i.e., vehicle 10 rearward when the tailgate assembly 14 is in the closed position) of the tailgate assembly 14. The retaining portion 56 may also include a third section 78 that extends laterally from the tailgate assembly 14 and a fourth section 80 that extends towards the interior side 22 of the tailgate assembly 14 (i.e., vehicle 10 forward when the tailgate assembly 14 is in the closed position).

The second and fourth sections 76, 80 of the retaining portion 56 may define an opening 82 therebetween. A cord 58, a retaining device, and/or any other item may be disposed through the opening 82 for utilization of the tie-down member 46. For example, as illustrated in FIG. 9, a container 84, such as a bag, may be inserted through the opening 82 and hang from the tie-down member 46. Additionally, and/or alternatively, any section 74, 76, 78, 80 of the tie-down member 46 may be configured as a bottle opener that removes a cap from a bottle 86.

Referring to FIG. 10, the cable 50 may be disposed through the opening 82 and within the retaining portion 56 of the tie-down member 46. Accordingly, the tailgate assembly 14 may be disposed in a substantially constant intermediate position, wherein the tailgate assembly 14 is on any desired angle between the open position and the closed position. Moreover, the cable 50 may have a ratchet type assembly, or any other assembly, that alters the length of the cable 50 so that the tailgate assembly 14 may be placed in a wide range of intermediate positions. The retaining portion 56, and/or the base portion 52, of the tie-down member 46 may include radiused edges such that the cable 50, and/or any coatings thereon, are not disturbed or cut while placing the tailgate assembly 14 in an intermediate position.

Figure 11:
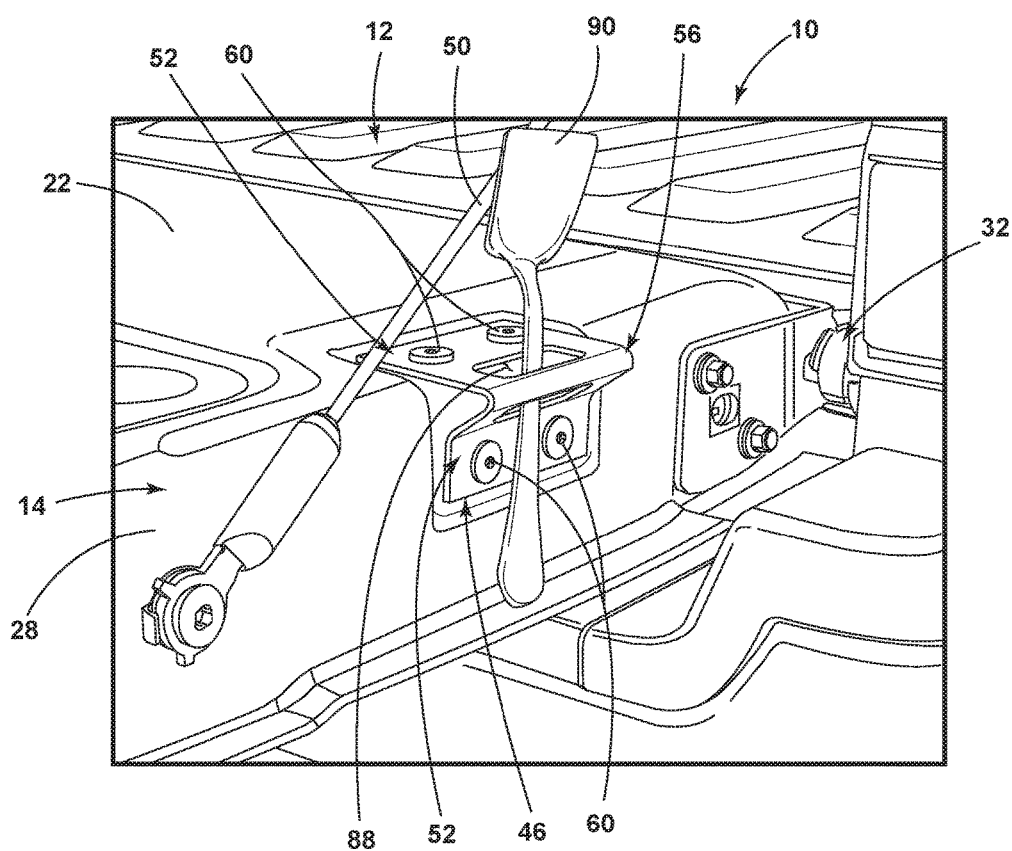
FIG. 11 is a rear side perspective view of the pickup cargo box illustrating the tie-down member having a retaining portion that extends in a lateral direction.
Figure 12:
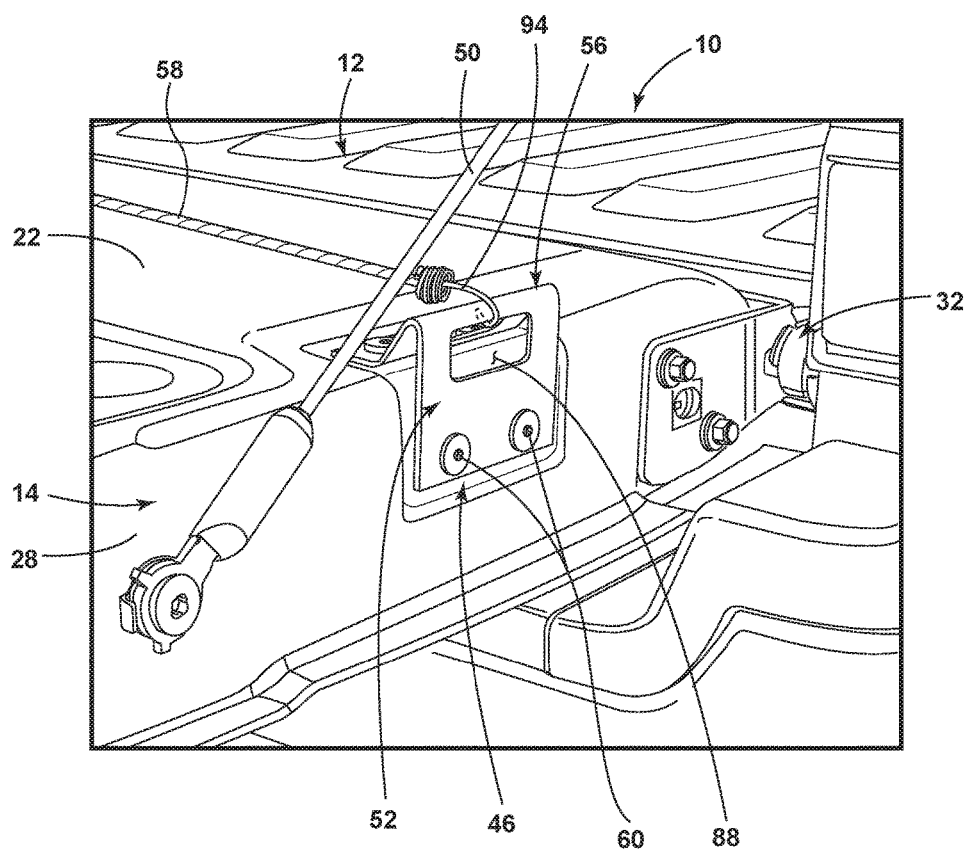
FIG. 12 is a rear side perspective view of the pickup cargo box illustrating the tie-down member having a retaining portion that extends in a vehicle-forward direction when the tailgate assembly is in the closed position.

Referring to FIGS. 11 and 12, the base portion 52 of the tie-down member 46 may be coupled to more than one side 22, 24, 26, 28 of the tailgate assembly 14. For example, the base portion 52 may be coupled to the lateral side 26, 28 and the interior side 22 of the tailgate assembly 14 to provide anchoring in two intersecting directions. The retaining portion 56 extends from the base portion 52 and includes one or more apertures 88 therethrough. A tool 90 or device, such as a spatula, screwdriver, wrench, etc. may be disposed within the apertures 88. Furthermore, the cord 58 may be passed through the one or more apertures 88. Moreover, a retaining device may also be configured to attach to the apertures 88.

The retaining portion 56 may extend in a lateral direction, as illustrated in FIG. 11, or in a vehicle 10 forward direction, as illustrated in FIG. 12. In either construction, the tie-down member 46 may be concealed when the tailgate assembly 14 is placed in the closed position and accessible in the open position.

Figure 13:
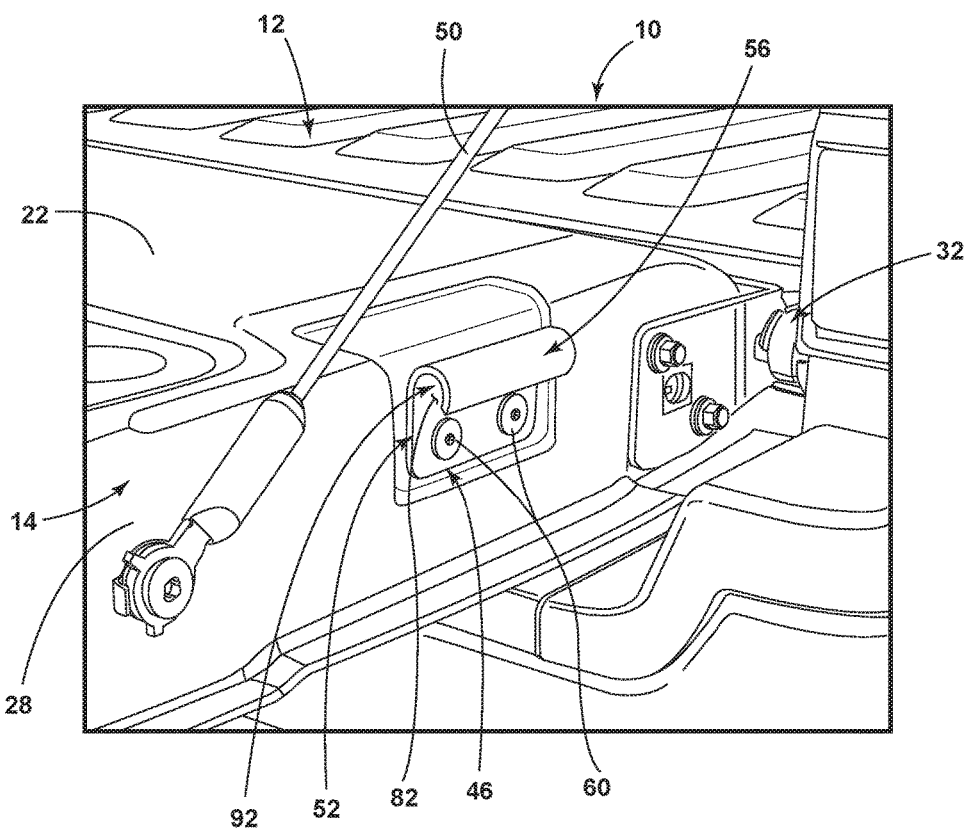
FIG. 13 is a rear side perspective view of the pickup cargo box illustrating the tie-down member having a curved retaining portion that extends in a vehicle-rearward direction when the tailgate assembly is in the closed position.

Referring to FIG. 13, the retaining portion 56 of the tie-down member 46 may have a curved profile 92, in some embodiments. As illustrated in FIG. 13, the curved profile 92 may be vehicle 10 forward of the opening 82. Accordingly, the cord 58 may be disposed within the retaining portion 56 while the tailgate assembly 14 is in the open position.

Accordingly, the tailgate assembly advantageously provides for a multifunctional tailgate assembly arrangement for a vehicle, such as a pickup truck. The tailgate assembly allows for securement of cargo that extends above the tailgate assembly when the tailgate assembly is disposed in the open position. The tie-down member 46 may also provide additional functionality further refining the vehicle. Finally, the additional securement points may be provided with little additional cost due to the low production costs of the tie-down member 46.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate tie-down members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A vehicle comprising:
   a tailgate assembly adapted to pivotally latch to a vehicle cargo box; and
   a tie-down member coupled to the tailgate assembly and having a base portion disposed on a lateral side of the tailgate assembly and a retaining portion extending from the base portion, wherein the retaining portion includes first and second substantially parallel channels positioned on opposing sides of the tie-down member.

2. The vehicle of claim 1, wherein the tie-down member is coupled to the tailgate assembly through the use of a mechanical fastener.

3. The vehicle of claim 2, wherein the tie-down member is integrally formed with a portion of the tailgate assembly.

4. The vehicle of claim 2, wherein the first channel has a geometrical cross section that is different from a geometrical cross section of the second channel.

5. The vehicle of claim 1, wherein at least one of the first and second channels is configured as a bottle opener.

6. The vehicle of claim 5, wherein a laterally extending portion of the retaining portion extends upwardly to hang an item from the tie-down member.

7. The vehicle of claim 1, wherein the tie-down member is an extruded component.

8. The vehicle of claim 1, wherein the tie-down member is a stamped component.

9. A vehicle comprising:
   a tailgate assembly adapted to pivotally latch to a cargo box, the tailgate assembly laterally separated from the cargo box by a gap; and
   a tie-down member coupled to the tailgate assembly and having a retaining portion extending from a base portion and defining first and second channels on opposing sides thereof, wherein the tie-down member has a thickness that is less than a thickness of the gap.

10. The vehicle of claim 9, wherein the retaining portion has a first section that extends laterally away from the tailgate assembly and a second section that extends towards a rear portion of the tailgate assembly.

11. The vehicle of claim 4-9, wherein the tie-down member is concealed when the tailgate assembly is in a closed position.

12. The vehicle of claim 9, wherein the retaining portion includes a notch therein.

13. The vehicle of claim 9, wherein the first and second channels are substantially parallel.

14. The vehicle of claim 9, wherein the retaining portion defines an opening through which a cord may be inserted and retained.

15. A vehicle comprising:
   a tailgate assembly adapted to pivotally latch to a cargo box; and
   a tie-down member coupled to the tailgate assembly and having a base portion and a retaining portion extending from the base portion, wherein the retaining portion has a first section that extends laterally away from the tailgate assembly and a second section that extends towards a rear portion of the tailgate assembly, and further wherein the retaining portion defines first and second channels on opposing sides of the retaining portion.

16. The vehicle of claim 15, wherein the tailgate assembly is laterally separated from the cargo box by a gap and the tie-down member has a thickness that is less than a thickness of the gap.

17. The vehicle of claim 15, wherein the retaining portion defines an opening.

18. The vehicle of assembly claim 17, wherein a support cable of the vehicle may be disposed through the opening for holding the tailgate assembly in an intermediate position.

19. The vehicle of claim 15, wherein the first and second channels are substantially parallel.

20. The vehicle of claim 15, wherein the retaining portion includes a first section extending transversely from the base portion and a second section extending transversely from the first section.

* * * * *